US012103038B2

(12) United States Patent
Takada et al.

(10) Patent No.: US 12,103,038 B2
(45) Date of Patent: Oct. 1, 2024

(54) CROSSLINKED FLUORORESIN-COATED ROTOR MANUFACTURING METHOD

(71) Applicants: Sumitomo Electric Sintered Alloy, Ltd., Takahashi (JP); Sumitomo Electric Industries, Ltd., Osaka (JP)

(72) Inventors: Shoichi Takada, Takahashi (JP); Masato Uozumi, Takahashi (JP); Makoto Nakabayashi, Osaka (JP); Eiichi Kobayashi, Osaka (JP); Kazuaki Ikeda, Osaka (JP)

(73) Assignees: SUMITOMO ELECTRIC SINTERED ALLOY, LTD., Takahashi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 244 days.

(21) Appl. No.: 17/774,143

(22) PCT Filed: Dec. 24, 2019

(86) PCT No.: PCT/JP2019/050632

§ 371 (c)(1), (2) Date: May 4, 2022

(87) PCT Pub. No.: WO2021/130862

PCT Pub. Date: Jul. 1, 2021

(65) Prior Publication Data

US 2022/0388028 A1 Dec. 8, 2022

(51) Int. Cl.
*B05D 1/00* (2006.01)
*B05D 1/32* (2006.01)
(Continued)

(52) U.S. Cl.
CPC ............... *B05D 1/322* (2013.01); *B05D 3/06* (2013.01); *F04C 2/103* (2013.01); *F04C 2230/91* (2013.01); *F04C 2240/20* (2013.01)

(58) Field of Classification Search
CPC ........................................................ B05D 3/00
See application file for complete search history.

(56) References Cited

U.S. PATENT DOCUMENTS 3,226,245 A * 12/1965 Dettling .................. B05C 13/00 427/195
3,618,929 A * 11/1971 Upchurch ............... B05B 12/18 269/238
(Continued)

FOREIGN PATENT DOCUMENTS

JP 56-59181 U 5/1981
JP 2014-47751 A 3/2014
(Continued)

OTHER PUBLICATIONS

JP-2014240614-A, English Translated (Year: 2014).*

*Primary Examiner* — Kelly M Gambetta
*Assistant Examiner* — Mohammad Mayy
(74) *Attorney, Agent, or Firm* — XSENSUS LLP

(57) ABSTRACT

A crosslinked fluororesin-coated rotor manufacturing method is a method for manufacturing an annular outer rotor of an internal gear pump including the outer rotor, and an inner rotor, a side surfaces of the outer rotor being coated with a crosslinked fluororesin, an inner peripheral surface of the outer rotor not being coated with the crosslinked fluororesin, the method including: using an outer masking jig for covering the inner peripheral surface in a state where the side surfaces of the outer rotor are exposed; coating the outer rotor with an uncrosslinked fluororesin in a state where the outer masking jig is mounted to the outer rotor; and then irradiating the fluororesin with radiation in a state where the outer masking jig is removed from the outer rotor, to crosslink the fluororesin.

9 Claims, 10 Drawing Sheets

(51) Int. Cl.
*B05D 3/06* (2006.01)
*F04C 2/10* (2006.01)

(56) References Cited

U.S. PATENT DOCUMENTS

| | | | | | |
|---|---|---|---|---|---|
| 5,686,144 | A * | 11/1997 | Thebault | F16D 69/023 | 427/430.1 |
| 5,785,771 | A * | 7/1998 | Mitchell, Jr. | C23C 8/04 | 205/135 |
| 2004/0112172 | A1* | 6/2004 | Shimizu | F16C 17/045 | 75/751 |
| 2005/0074548 | A1* | 4/2005 | Puterbaugh | H02K 15/12 | 427/104 |

FOREIGN PATENT DOCUMENTS

| | | | |
|---|---|---|---|
| JP | 2014-173513 | A | 9/2014 |
| JP | 2014240614 | A * | 12/2014 |

* cited by examiner

CROSSLINKED FLUORORESIN-COATED ROTOR MANUFACTURING METHOD

CROSS-REFERENCE TO RELATED APPLICATIONS

The present application is based on PCT/JP2019/050632 filed on Dec. 24, 2019, the entire contents of which is incorporated herein by reference.

TECHNICAL FIELD

The present disclosure relates to a crosslinked fluororesin-coated rotor manufacturing method.

BACKGROUND ART

As an internal gear pump, a pump described in PATENT LITERATURE 1 is known. The internal gear pump of PATENT LITERATURE 1 includes an annular outer rotor, an inner rotor which rotates about a position eccentric from the center of the outer rotor on the radially inner side of the outer rotor, and a housing in which the outer rotor and the inner rotor are housed. Here, the outer rotor has an inner peripheral surface forming a plurality of internal teeth, and side surfaces orthogonal to an axial direction. In addition, the inner rotor has an outer peripheral surface forming a plurality of external teeth which mesh with the internal teeth of the outer rotor, and side surfaces orthogonal to the axial direction.

Generally, a clearance (side clearance) for permitting rotation of the outer rotor is set between each side surface of the outer rotor and the housing. If the side clearance is large, the leak amount of fluid increases, decreasing the discharge amount of the pump. Thus, it is preferable that the side clearance is small. However, if the side clearance is made excessively small, there is a problem that seizure easily occurs between each side surface of the outer rotor and the housing. Therefore, the side clearance is usually set to a size of several tens of micrometers or more.

Similarly, a clearance (side clearance) for permitting rotation of the inner rotor is also set between each side surface of the inner rotor and the housing. This side clearance is also usually set to a size of several tens of micrometers or more.

Here, the applicants of the present application have developed an internal gear pump that allows clearances of an outer rotor and an inner rotor to be set to be very small while preventing seizure of the outer rotor and the inner rotor, and have proposed a pump of PATENT LITERATURE 2 as such an internal gear pump.

In the internal gear pump of PATENT LITERATURE 2, at least one of an outer rotor, an inner rotor, and a housing is coated with a crosslinked fluororesin. Since the crosslinked fluororesin has characteristics of having a low friction coefficient and high wear resistance, if at least one of the outer rotor, the inner rotor, and the housing is coated with the crosslinked fluororesin, even when the clearances of the outer rotor and the inner rotor are set to be very small, it is possible to prevent seizure of the outer rotor and the inner rotor over a long period of time.

CITATION LIST

Patent Literature

PATENT LITERATURE 1: Japanese Laid-Open Patent Publication No. 2014-47751

PATENT LITERATURE 2: Japanese Laid-Open Patent Publication No. 2014-173513

SUMMARY OF THE INVENTION

Solution to Problem

A crosslinked fluororesin-coated rotor manufacturing method according to an aspect of the present disclosure is a crosslinked fluororesin-coated rotor manufacturing method for manufacturing an annular outer rotor of an internal gear pump including

- the outer rotor having an inner peripheral surface forming a plurality of internal teeth, and side surfaces orthogonal to an axial direction, and
- an inner rotor having an outer peripheral surface forming a plurality of external teeth which mesh with the internal teeth, and configured to rotate about a position eccentric from a center of the outer rotor on a radially inner side of the outer rotor,
- the side surfaces of the outer rotor being coated with a crosslinked fluororesin, the inner peripheral surface of the outer rotor not being coated with the crosslinked fluororesin, the method including:
- using an outer masking jig for covering the inner peripheral surface in a state where the side surfaces of the outer rotor are exposed, the outer masking jig including a positioning fitting tooth portion for positioning the outer masking jig with respect to the outer rotor in a circumferential direction by fitting to the inner peripheral surface of the outer rotor;
- coating the outer rotor with an uncrosslinked fluororesin in a state where the outer masking jig is mounted to the outer rotor; and
- then irradiating the fluororesin with radiation in a state where the outer masking jig is removed from the outer rotor, to crosslink the fluororesin.

Moreover, a crosslinked fluororesin-coated rotor manufacturing method according to an aspect of the present disclosure is a crosslinked fluororesin-coated rotor manufacturing method for manufacturing an inner rotor of an internal gear pump including

- an annular outer rotor having an inner peripheral surface forming a plurality of internal teeth, and
- the inner rotor having an outer peripheral surface forming a plurality of external teeth which mesh with the internal teeth, and side surfaces orthogonal to an axial direction, and configured to rotate about a position eccentric from a center of the outer rotor on a radially inner side of the outer rotor,
- the side surfaces of the inner rotor being coated with a crosslinked fluororesin, the outer peripheral surface of the inner rotor not being coated with the crosslinked fluororesin, the method including:
- using an inner masking jig for covering the outer peripheral surface in a state where the side surfaces of the inner rotor are exposed, the inner masking jig including a positioning fitting tooth portion for positioning the inner masking jig with respect to the inner rotor in a circumferential direction by fitting to the outer peripheral surface of the inner rotor;
- coating the inner rotor with an uncrosslinked fluororesin in a state where the inner masking jig is mounted to the inner rotor; and then irradiating the fluororesin with radiation in a state where the inner masking jig is removed from the inner rotor, to crosslink the fluororesin.

DETAILED DESCRIPTION

Figure 1:
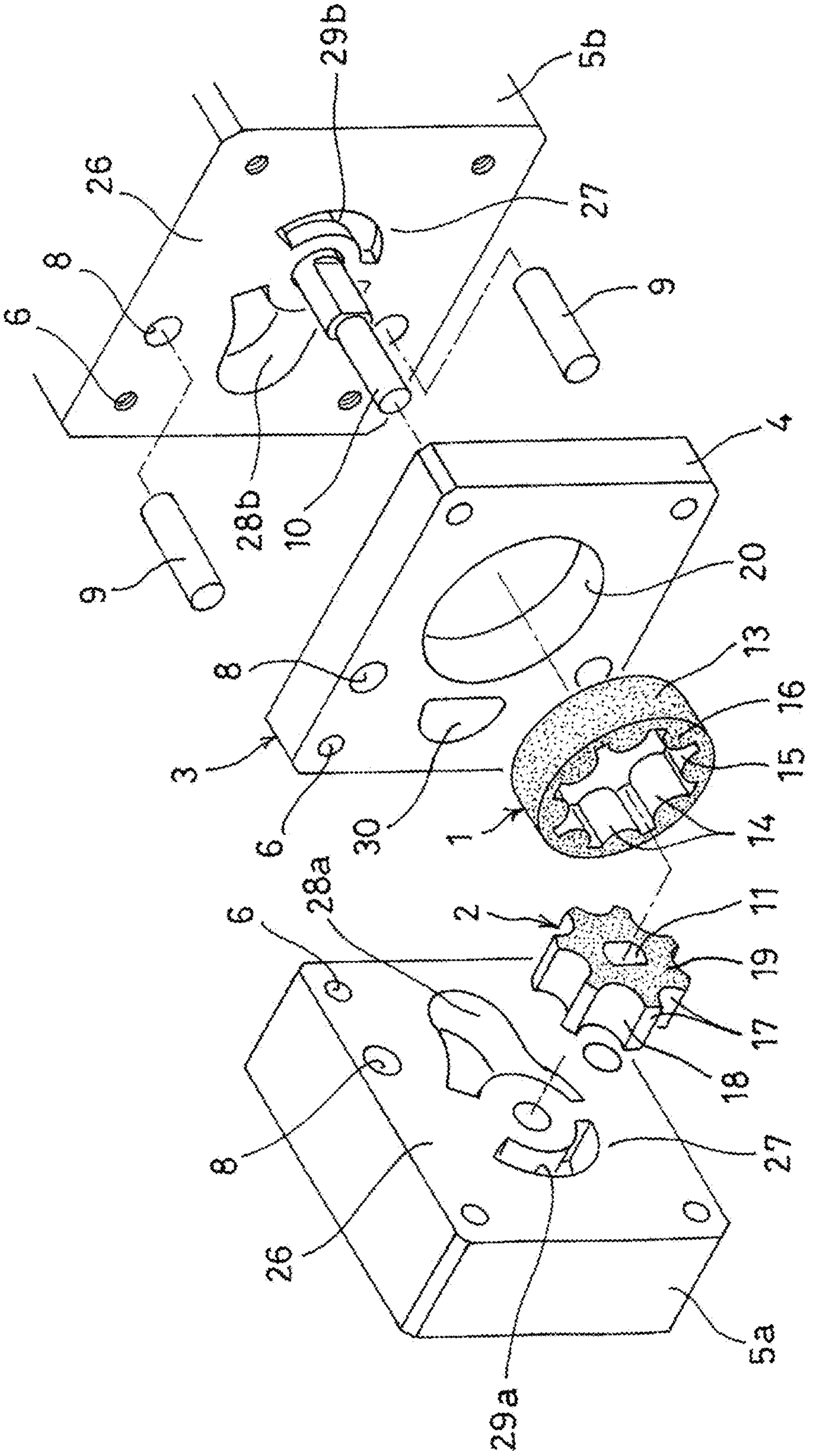
FIG. 1 is an exploded perspective view of an internal gear pump in which an outer rotor and an inner rotor obtained by a crosslinked fluororesin-coated rotor manufacturing method according to an embodiment of the present disclosure are used.

Problems to be Solved by the Present Disclosure

The inventors of the present application have conducted in-house development of an internal gear pump in which at least one of an outer rotor, an inner rotor, and a housing is coated with a crosslinked fluororesin as in PATENT LITERATURE 2, and have studied mass production of a pump in which an outer rotor and an inner rotor are coated with a crosslinked fluororesin, as such an internal gear pump.

Here, when coating an outer rotor with a crosslinked fluororesin, it is considered to coat the entirety of the surface (an inner peripheral surface forming internal teeth of the outer rotor, side surfaces of the outer rotor, an outer peripheral surface of the outer rotor) of the outer rotor. In addition, when coating an inner rotor with a crosslinked fluororesin, it is considered to coat the entirety of the surface (an outer peripheral surface forming external teeth of the inner rotor, side surfaces of the inner rotor, an inner peripheral surface of the inner rotor) of the inner rotor.

However, when the entirety of the surface of the outer rotor is coated with the crosslinked fluororesin, or when the entirety of the surface of the inner rotor is coated with the crosslinked fluororesin, it is difficult to accurately manage the clearance (tip clearance) between the external teeth of the outer rotor and the internal teeth of the inner rotor, thus facing a problem that the pump performance becomes unstable.

That is, since the inner peripheral surface forming the internal teeth of the outer rotor is a curved surface having the toothed shape of the internal teeth, it is difficult to accurately manage the thickness of the crosslinked fluororesin when coating the inner peripheral surface of the outer rotor with the crosslinked fluororesin. Similarly, since the outer peripheral surface forming the external teeth of the inner rotor is also a curved surface having the toothed shape of the external teeth, it is difficult to accurately manage the thickness of the crosslinked fluororesin when coating the outer peripheral surface of the inner rotor with the crosslinked fluororesin. Therefore, the size of the tip clearance between the internal teeth on the inner periphery of the outer rotor and the external teeth on the outer periphery of the inner rotor is not stable, thus facing a problem that the pump performance becomes unstable.

Therefore, the inventors have studied not coating the inner peripheral surface of the outer rotor and the outer peripheral surface of the inner rotor when coating the outer rotor and the inner rotor with the crosslinked fluororesin, in order to stabilize the size of the tip clearance between the internal teeth on the inner periphery of the outer rotor and the external teeth on the outer periphery of the inner rotor. Specifically, the inventors have studied coating a portion of the outer rotor excluding the inner peripheral surface by attaching masking tape to the inner peripheral surface of the outer rotor when coating the surface of the outer rotor with the crosslinked fluororesin. In addition, the inventors have studied coating a portion of the inner rotor excluding the outer peripheral surface by attaching masking tape to the outer peripheral surface of the inner rotor when coating the surface of the inner rotor with the crosslinked fluororesin.

However, since the inner peripheral surface of the outer rotor is a curved surface having the toothed shape of the internal teeth, it is difficult to attach the masking tape such that the masking tape is in close contact with the inner peripheral surface of the outer rotor. Similarly, since the outer peripheral surface of the inner rotor is also a curved surface having the toothed shape of the external teeth, it is difficult to attach the masking tape such that the masking tape is in close contact with the outer peripheral surface of the inner rotor.

Therefore, an object of the present disclosure is to easily manufacture a rotor, of an internal gear pump, which can prevent seizure of the rotor over a long period of time and has stable performance.

Effects of the Present Disclosure

According to the present disclosure, it is possible to easily manufacture a rotor, of an internal gear pump, which can prevent seizure of the rotor over a long period of time and has stable performance.

Description of Embodiments of the Present Disclosure (1) A crosslinked fluororesin-coated rotor manufacturing method according to an aspect of the present disclosure is a crosslinked fluororesin-coated rotor manufacturing method for manufacturing an annular outer rotor of an internal gear pump including the outer rotor having an inner peripheral surface forming a plurality of internal teeth, and side surfaces orthogonal to an axial direction, and an inner rotor having an outer peripheral surface forming a plurality of external teeth which mesh with the internal teeth, and configured to rotate about a position eccentric from a center of the outer rotor on a radially inner side of the outer rotor, the side surfaces of the outer rotor being coated with a crosslinked fluororesin, the inner peripheral surface of the outer rotor not being coated with the crosslinked fluororesin, the method including:

using an outer masking jig for covering the inner peripheral surface in a state where the side surfaces of the outer rotor are exposed, the outer masking jig including a positioning fitting tooth portion for positioning the outer masking jig with respect to the outer rotor in a circumferential direction by fitting to the inner peripheral surface of the outer rotor;

coating the outer rotor with an uncrosslinked fluororesin in a state where the outer masking jig is mounted to the outer rotor; and then irradiating the fluororesin with radiation in a state where the outer masking jig is removed from the outer rotor, to crosslink the fluororesin.

When doing so, since the side surfaces of the outer rotor are coated with the crosslinked fluororesin, even when the side clearance of the outer rotor is set to be very small, it is possible to prevent seizure of the outer rotor over a long period of time.

Since the outer masking jig for covering the inner peripheral surface in a state where the side surfaces of the outer rotor are exposed is used when coating the outer rotor with the uncrosslinked fluororesin, the inner peripheral surface of the outer rotor is not coated with the fluororesin. Therefore, the size of the tip clearance between the internal teeth on the inner periphery of the outer rotor and the external teeth on the outer periphery of the inner rotor becomes stable, and the pump performance becomes stable.

Since the positioning fitting tooth portion for positioning the outer masking jig with respect to the outer rotor in the circumferential direction by fitting to the inner peripheral surface of the outer rotor is formed in the outer masking jig, the work of mounting the outer masking jig to the outer rotor is easy.

When crosslinking the uncrosslinked fluororesin by irradiating the fluororesin with radiation, the irradiation with radiation is performed in a state where the outer masking jig is removed from the outer rotor. Therefore, the radiation is prevented from being blocked by the outer masking jig, and it is possible to evenly and uniformly crosslink the fluororesin.

(2) As the outer masking jig, a jig having a toothed flange which overlaps peripheral portions, along the inner peripheral surface, of the side surfaces of the outer rotor is preferably used.

When doing so, when coating the outer rotor with the uncrosslinked fluororesin, most of each side surface of the outer rotor can be exposed while assuredly covering the inner peripheral surface of the outer rotor with the toothed flange. Therefore, it is possible to coat most of each side surface of the outer rotor with the crosslinked fluororesin while preventing the inner peripheral surface of the outer rotor from being coated.

(3) The toothed flange is preferably formed such that a region where the toothed flange overlaps the side surfaces of the outer rotor has a width of not greater than 0.5 mm.

When doing so, it is possible to coat almost the entirety of each side surface of the outer rotor with the crosslinked fluororesin.

(4) In the case where the outer rotor has a cylindrical outer peripheral surface, both the side surfaces and the outer peripheral surface of the outer rotor can be coated with the uncrosslinked fluororesin when coating the outer rotor with the uncrosslinked fluororesin in a state where the outer masking jig is mounted to the outer rotor; and both the fluororesin on the side surfaces and the fluororesin on the outer peripheral surface can then be crosslinked when irradiating the fluororesin with radiation in a state where the outer masking jig is removed from the outer rotor.

When doing so, since not only the side surfaces of the outer rotor but also the outer peripheral surface of the outer rotor is coated with the crosslinked fluororesin, it is possible to effectively reduce the torque for rotationally driving the outer rotor.

(5) A crosslinked fluororesin-coated rotor manufacturing method according to an aspect of the present disclosure is a crosslinked fluororesin-coated rotor manufacturing method for manufacturing an inner rotor of an internal gear pump including an annular outer rotor having an inner peripheral surface forming a plurality of internal teeth, and the inner rotor having an outer peripheral surface forming a plurality of external teeth which mesh with the internal teeth, and side surfaces orthogonal to an axial direction, and configured to rotate about a position eccentric from a center of the outer rotor on a radially inner side of the outer rotor, the side surfaces of the inner rotor being coated with a crosslinked fluororesin, the outer peripheral surface of the inner rotor not being coated with the crosslinked fluororesin, the method including:

using an inner masking jig for covering the outer peripheral surface in a state where the side surfaces of the inner rotor are exposed, the inner masking jig including a positioning fitting tooth portion for positioning the inner masking jig with respect to the inner rotor in a circumferential direction by fitting to the outer peripheral surface of the inner rotor;

coating the inner rotor with an uncrosslinked fluororesin in a state where the inner masking jig is mounted to the inner rotor; and then irradiating the fluororesin with radiation in a state where the inner masking jig is removed from the inner rotor, to crosslink the fluororesin.

When doing so, since the side surfaces of the inner rotor are coated with the crosslinked fluororesin, even when the side clearance of the inner rotor is set to be very small, it is possible to prevent seizure of the inner rotor over a long period of time.

Since the inner masking jig for covering the outer peripheral surface in a state where the side surfaces of the inner rotor are exposed is used when coating the inner rotor with the uncrosslinked fluororesin, the outer peripheral surface of the inner rotor is not coated with the fluororesin. Therefore, the size of the tip clearance between the internal teeth on the inner periphery of the outer rotor and the external teeth on the outer periphery of the inner rotor becomes stable, and the pump performance becomes stable.

Since the positioning fitting tooth portion for positioning the inner masking jig with respect to the inner rotor in the circumferential direction by fitting to the outer peripheral surface of the inner rotor is formed in the inner masking jig, the work of mounting the inner masking jig to the inner rotor is easy.

When crosslinking the uncrosslinked fluororesin by irradiating the fluororesin with radiation, the irradiation with radiation is performed in a state where the inner masking jig is removed from the inner rotor. Therefore, the radiation is prevented from being blocked by the inner masking jig, and it is possible to evenly and uniformly crosslink the fluororesin.

(6) As the inner masking jig, a jig having a toothed flange which overlaps peripheral portions, along the outer peripheral surface, of the side surfaces of the inner rotor is preferably used.

When doing so, when coating the inner rotor with the uncrosslinked fluororesin, most of each side surface of the inner rotor can be exposed while assuredly covering the outer peripheral surface of the inner rotor with the toothed flange. Therefore, it is possible to coat most of each side surface of the inner rotor with the crosslinked fluororesin while preventing the outer peripheral surface of the inner rotor from being coated.

(7) The toothed flange is preferably formed such that a region where the toothed flange overlaps the side surfaces of the inner rotor has a width of not greater than 0.5 mm.

When doing so, it is possible to coat almost the entirety of each side surface of the inner rotor with the crosslinked fluororesin.

Details of Embodiments of the Present Disclosure

Hereinafter, specific examples of a crosslinked fluororesin-coated rotor manufacturing method according to an embodiment of the present disclosure will be described with reference to the drawings. The present invention is not limited to these examples and is indicated by the claims, and is intended to include meaning equivalent to the claims and all modifications within the scope of the claims.

FIG. 1 to FIG. 6 show an internal gear pump in which an outer rotor 1 and an inner rotor 2 obtained by a crosslinked fluororesin-coated rotor manufacturing method according to an embodiment of the present disclosure are used. The internal gear pump includes the annular outer rotor 1, the inner rotor 2 which is disposed on the radially inner side of the outer rotor 1, and a housing 3 in which the outer rotor 1 and the inner rotor 2 are housed.

Figure 3:
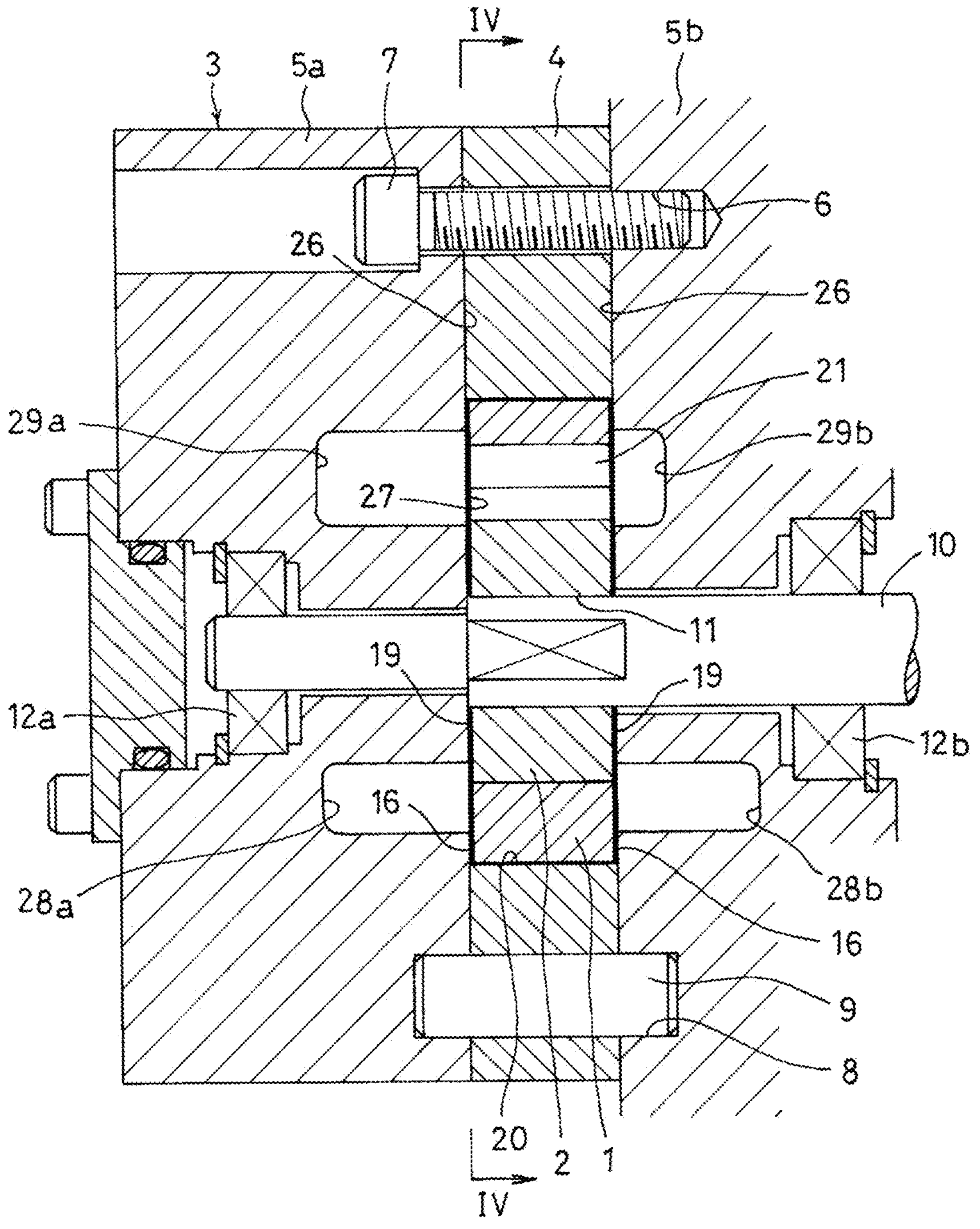
FIG. 3 is a cross-sectional view taken along a line in FIG. 2.

As shown in FIG. 3, the housing 3 includes a housing body 4 which is formed in a hollow tubular shape surrounding the outer periphery of the outer rotor 1, a first side component 5*a* which is detachably attached to one end portion in the axial direction (an end portion on the left side in the drawing) of the housing body 4, and a second side component 5*b* which is detachably attached to another end portion in the axial direction (an end portion on the right side in the drawing) of the housing body 4.

The first side component 5*a*, the housing body 4, and the second side component 5*b* are fixed to each other by inserting common bolts 7 into bolt insertion holes 6 formed in each component and tightening these components with the bolts 7. In addition, the first side component 5*a*, the housing body 4, and the second side component 5*b* are positioned in a direction perpendicular to the axis by inserting common knock pins 9 into knock pin insertion holes 8 formed in each component.

In the inner rotor 2, a shaft hole 11 into which a rotation shaft 10 is inserted is formed. The rotation shaft 10 is a shaft body which rotationally drives the inner rotor 2, and is connected to a rotary drive device (electric motor or the like) which is not shown. The rotation shaft 10 and the shaft hole 11 are fitted to each other such that the rotation shaft 10 and the inner rotor 2 rotate integrally. In addition to the width-across-flat fitting as shown in the drawing, spline fitting, keyway fitting, and fitting with an interference between cylindrical surfaces (shrinkage fitting or press fitting) may be adopted for fitting the rotation shaft 10 and the shaft hole 11.

The shaft hole 11 of the inner rotor 2 is a through hole which penetrates the inner rotor 2 in the axial direction. The rotation shaft 10 is inserted into the shaft hole 11 so as to have a portion protruding on one side in the axial direction (the left side in the drawing) from the inner rotor 2 and a portion protruding on the other side in the axial direction (the right side in the drawing) from the inner rotor 2. The portion, of the rotation shaft 10, protruding on the one side in the axial direction from the inner rotor 2 is rotatably supported by a first bearing 12*a* mounted on the first side component 5*a*, and the portion, of the rotation shaft 10, protruding on the other side in the axial direction from the inner rotor 2 is rotatably supported by a second bearing 12*b* mounted on the second side component 5*b*.

Figure 4:
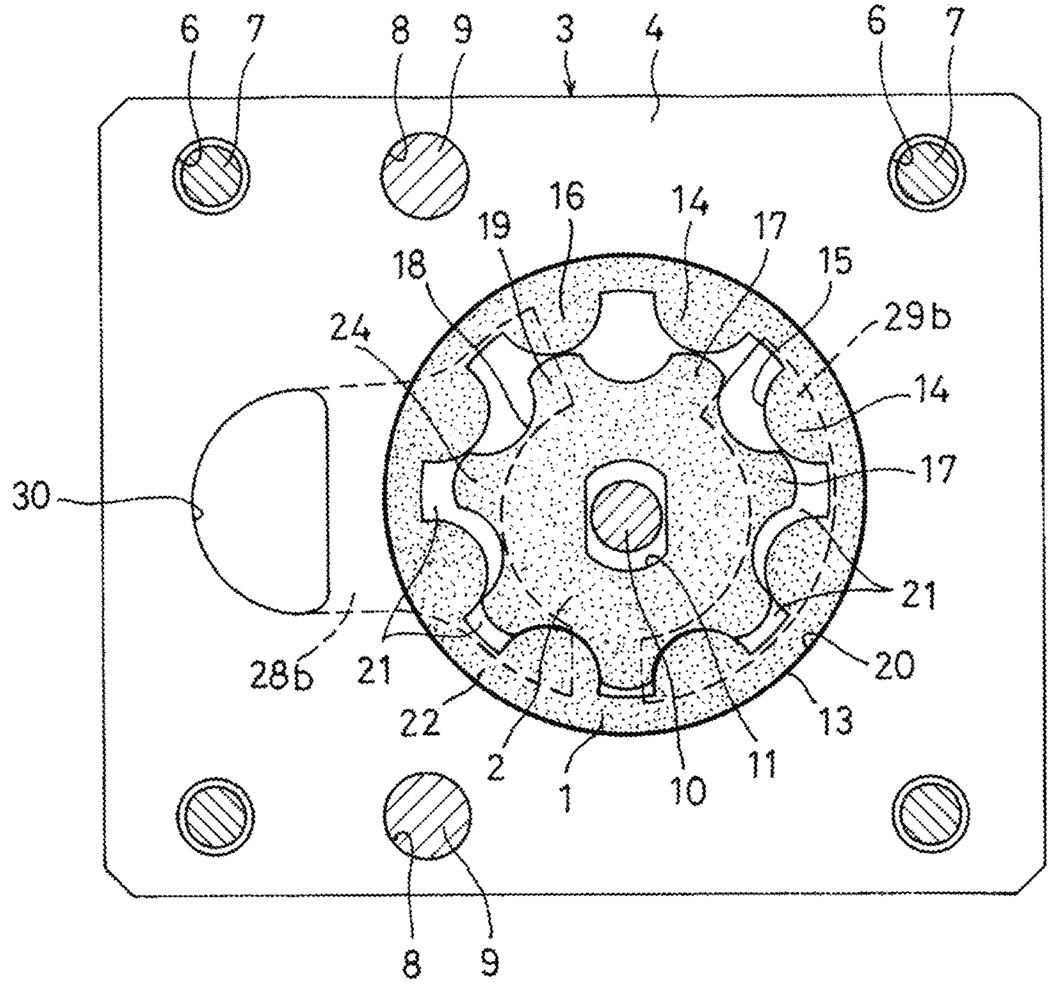
FIG. 4 is a cross-sectional view taken along a line IV-IV in FIG. 3.

As shown in FIG. 4, the outer rotor 1 is an annular member which has a cylindrical outer peripheral surface 13, an inner peripheral surface 15 forming a plurality of internal teeth 14, and side surfaces 16 (see FIG. 3) orthogonal to the axial direction. The inner rotor 2 is a member which has an outer peripheral surface 18 forming a plurality of external teeth 17 which mesh with the internal teeth 14 of the outer rotor 1, and side surfaces 19 (see FIG. 3) orthogonal to the axial direction.

The outer peripheral surface 13 of the outer rotor 1 is fitted to a cylindrical inner peripheral surface 20 of the housing body 4 with a gap therebetween, and the outer rotor 1 is rotatably supported by the fitting. Here, the outer rotor 1 is supported so as to be rotatable about a position eccentric from the center position of the inner rotor 2 (that is, the rotation center position of the rotation shaft 10). When the inner rotor 2 is rotated, the outer rotor 1 rotates together with the inner rotor 2 due to the meshing of the internal teeth 14 and the external teeth 17. The rotation direction of the inner rotor 2 is the clockwise direction in the drawing.

The number of internal teeth 14 of the outer rotor 1 is larger than the number of external teeth 17 of the inner rotor 2 by one. The outer peripheral surface 18 of the inner rotor 2 is a curved surface obtained as a trajectory by translating, in the axial direction, a tooth profile of the external teeth 17 (for example, a tooth profile in which curves that are radially outwardly curved in a convex shape and curves that are radially inwardly curved in a concave shape are alternately aligned along the circumferential direction, such as a trochoid curve or a cycloid curve). The inner peripheral surface 15 of the outer rotor 1 is also a curved surface obtained as a trajectory by translating, in the axial direction, a tooth profile of the internal teeth 14 (for example, a tooth profile in which curves that are radially outwardly curved in a convex shape and curves that are radially inwardly curved in a concave shape are alternately aligned along the circumferential direction, such as a trochoid curve, a cycloid curve, or an envelope curve of a tooth profile of the inner rotor 2).

A plurality of chambers 21 (spaces for containing fluid) defined by the respective external teeth 17 and the respective internal teeth 14 are formed between the outer periphery of the inner rotor 2 and the inner periphery of the outer rotor 1. Here, the plurality of chambers 21 are formed such that the volumes thereof change as the inner rotor 2 and the outer rotor 1 rotate. That is, the volume of each chamber 21 is maximized at an angular position at which the center of the inner rotor 2 and the center of the outer rotor 1 are farthest from each other (at the upper position in the drawing), and decreases as the chamber 21 comes closer to an angular position at which the center of the inner rotor 2 and the center of the outer rotor 1 are closest to each other (the lower position in the drawing). Therefore, when the inner rotor 2 and the outer rotor 1 rotate, fluid discharge action occurs on a side through which movement is made from the angular position at which the center of the inner rotor 2 and the center of the outer rotor 1 are farthest from each other to the angular position at which the center of the inner rotor 2 and the center of the outer rotor 1 are closest to each other (on the right side in the drawing), due to reduction of the volumes of the chambers 21. On the other hand, fluid suction action occurs on a side through which movement is made from the angular position at which the center of the inner rotor 2 and the center of the outer rotor 1 are closest to each other to the angular position at which the center of the inner rotor 2 and the center of the outer rotor 1 are farthest from each other (on the left side in the drawing), due to gradual increase of the volumes of the chambers 21.

Figure 5:
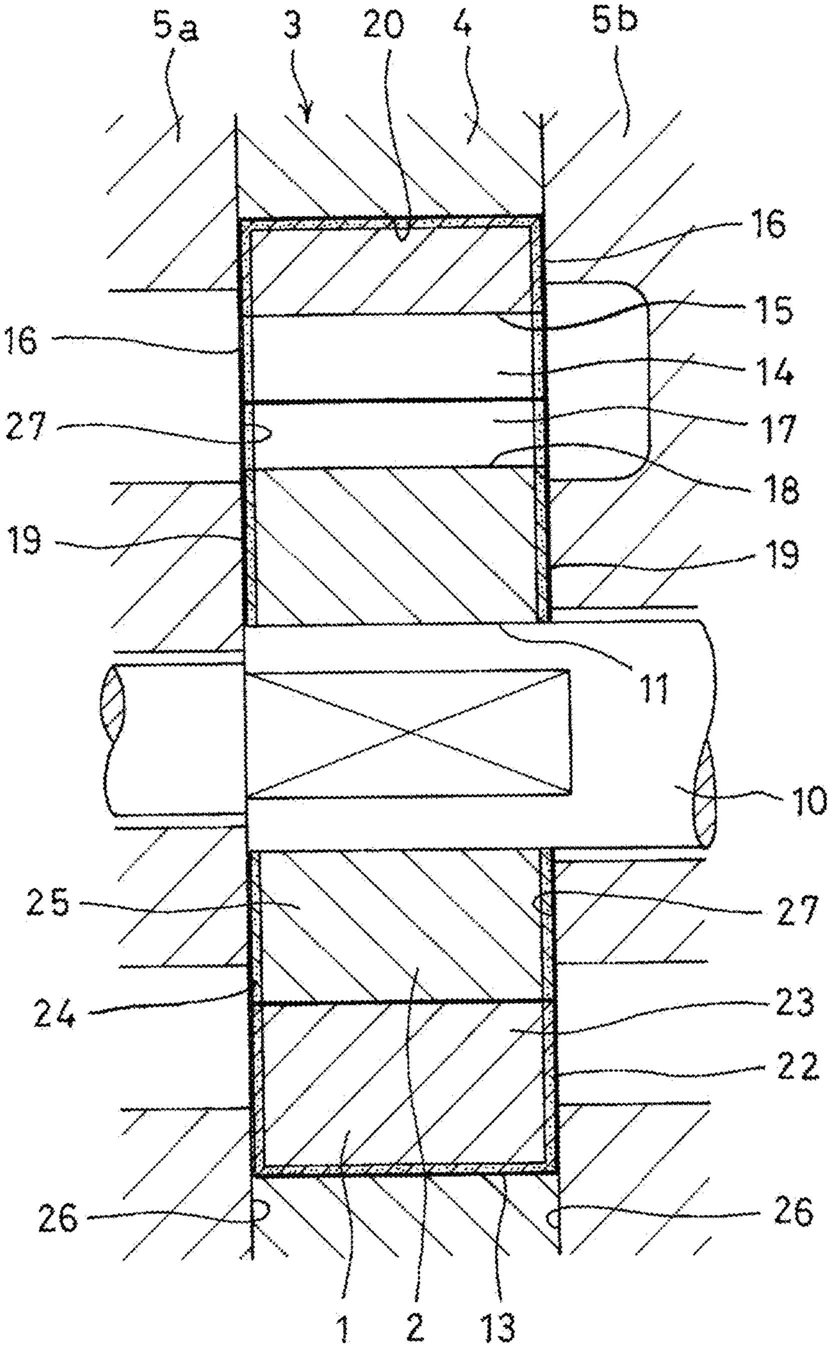
FIG. 5 is an enlarged view of an area around the outer rotor and the inner rotor in FIG. 3.

As shown in FIG. 5, the side surfaces 16 of the outer rotor 1 are a pair of flat surfaces which are formed on both sides in the axial direction of the outer rotor 1 so as to face opposite to each other in the axial direction. The side surfaces 19 of the inner rotor 2 are a pair of flat surfaces which are formed on both sides in the axial direction of the inner rotor 2 so as to face opposite to each other in the axial direction.

The side surfaces 16 and the outer peripheral surface 13 of the outer rotor 1 are surfaces coated with a crosslinked fluororesin 22 (crosslinked fluororesin surfaces). On the other hand, the inner peripheral surface 15 of the outer rotor 1 is a surface not coated with the crosslinked fluororesin 22 (metal surface). Here, the outer rotor 1 includes a sintered metal body 23 and a coating layer of the crosslinked fluororesin 22 provided so as to coat the surface of the sintered metal body 23. The sintered metal body 23 is formed by heating a powder compact, which is obtained by compression-molding an iron-based powder material with a mold, at a high temperature equal to or lower than the melting point of the material.

The crosslinked fluororesin 22 is obtained by crosslinking molecules of a chain polymer forming a fluororesin, and has a low friction coefficient equivalent to that of a general fluororesin (non-crosslinked fluororesin) but has wear resistance that is much higher than that of a general fluororesin.

As the fluororesin to be crosslinked, polytetrafluoroethylene (PTFE), tetrafluoroethylene-hexafluoropropylene copolymer (FEP), tetrafluoroethylene-perfluoroalkyl vinyl ether copolymer (PFA), and the like can be adopted. As the crosslinked fluororesin 22, crosslinked PTFE is preferably adopted. When crosslinked PTFE is adopted, since the crosslinked PTFE has a particularly low friction coefficient among the above fluororesins and has excellent wear resistance, almost no wear occurs, so that it is possible to effectively increase the pump efficiency.

Similarly, the side surfaces 19 of the inner rotor 2 are also surfaces coated with a crosslinked fluororesin 24 (crosslinked fluororesin surfaces). On the other hand, the outer peripheral surface 18 of the inner rotor 2 and the inner surface of the shaft hole 11 are surfaces not coated with the crosslinked fluororesin 24 (metal surfaces). Here, the inner rotor 2 includes a sintered metal body 25 and a coating layer of the crosslinked fluororesin 24 provided so as to coat the surface of the sintered metal body 25.

The width dimension between the pair of the side surfaces 16 of the outer rotor 1 is equal to the width dimension between the pair of the side surfaces 19 of the inner rotor 2. The side surface 16 on one side in the axial direction (the left side in the drawing) of the outer rotor 1 is located on the same plane as the side surface 19 on the one side in the axial direction (the left side in the drawing) of the inner rotor 2, and the side surface 16 on the other side in the axial direction (the right side in the drawing) of the outer rotor 1 is located on the same plane as the side surface 19 on the other side in the axial direction (the right side in the drawing) of the inner rotor 2.

The first side component 5*a* has a flat mating surface 26 which is pressed and fixed to a side surface on the one side in the axial direction of the housing body 4 by tightening the bolts 7, and a flat sliding guide surface 27 which slides and guides the side surface 16 on the one side in the axial direction of the outer rotor 1 and the side surface 19 on the one side in the axial direction of the inner rotor 2. The second side component 5*b* also has a flat mating surface 26 which is pressed and fixed to a side surface on the other side in the axial direction of the housing body 4 by tightening the bolts 7 and a flat sliding guide surface 27 which slides and guides the side surface 16 on the other side in the axial direction of the outer rotor 1 and the side surface 19 on the other side in the axial direction of the inner rotor 2. The sliding guide surfaces 27 are each a finished surface having a surface roughness of Ra 1.6 μm or less (preferably Ra 0.8 μm or less).

The gap between the side surfaces 16 of the outer rotor 1 and the housing 3 (that is, the difference between the width dimension between the pair of the side surfaces 16 of the outer rotor 1 and the inner width dimension between a pair of the sliding guide surfaces 27, facing each other in the axial direction, of the housing 3) is set so as to be not greater than 20 μm (preferably not greater than 15 μm, more preferably not greater than 10 μm). Similarly, the gap between the side surfaces 19 of the inner rotor 2 and the housing 3 (that is, the difference between the width dimension between the pair of the side surfaces 19 of the inner rotor 2 and the inner width dimension between the pair of the sliding guide surfaces 27, facing each other in the axial direction, of the housing 3) is also set so as to be not greater than 20 μm (preferably not greater than 15 μm, more preferably not greater than 10 μm).

Figure 6:
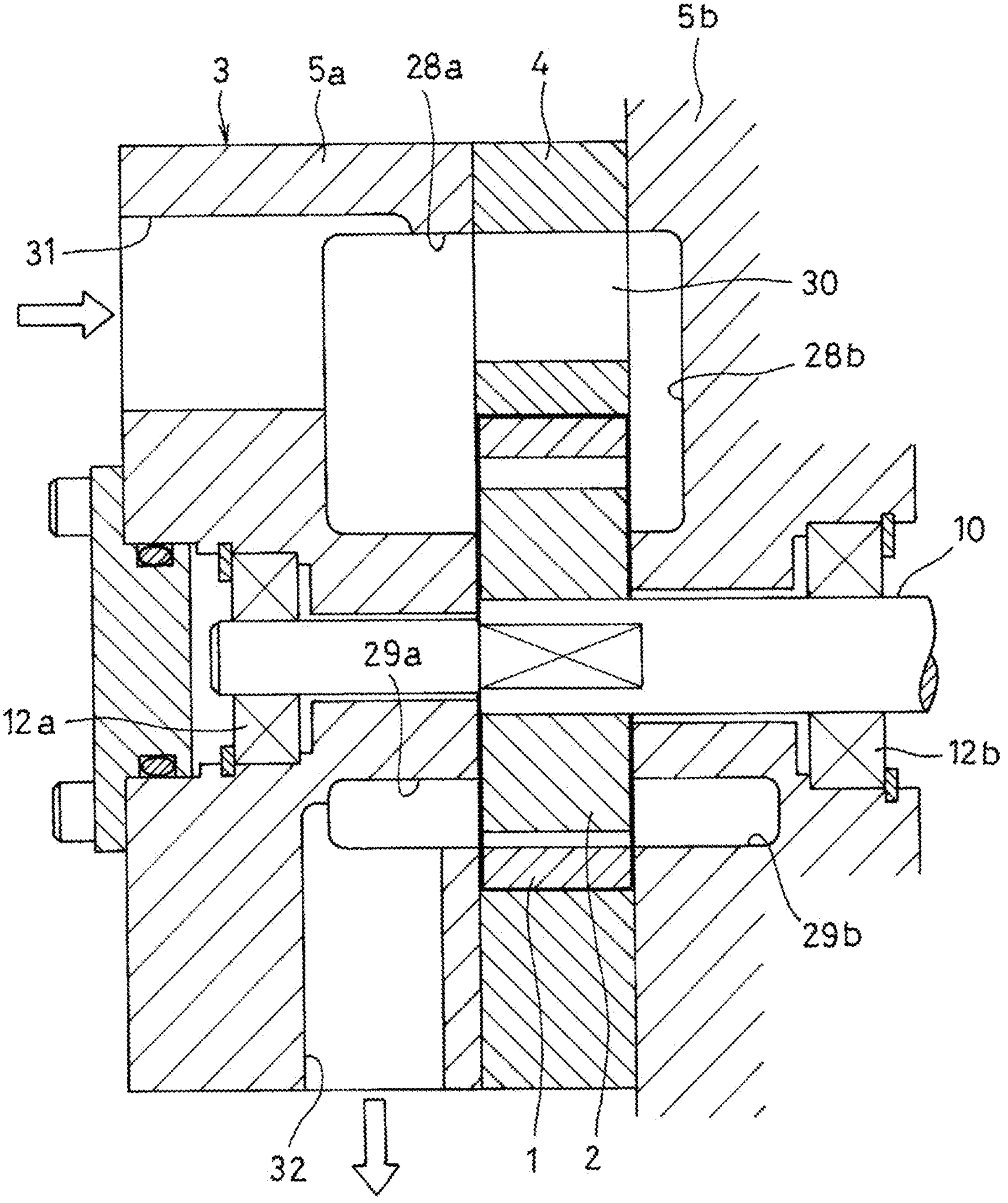
FIG. 6 is a cross-sectional view taken along a line VI-VI in FIG. 2.

As shown in FIG. 6, a first suction port 28*a* and a first discharge port 29*a* are open in the first side component 5*a*. In addition, a second suction port 28*b* and a second discharge port 29*b* are also open in the second side component 5*b*.

The first suction port 28*a* and the second suction port 28*b* are open in the same shape at symmetrical positions with the inner rotor 2 and the outer rotor 1 therebetween. Accordingly, the pressure received by the inner rotor 2 and the outer rotor 1 from fluid in the first suction port 28*a* and the pressure received by the inner rotor 2 and the outer rotor 1 from fluid in the second suction port 28*b* are balanced to prevent the inner rotor 2 and the outer rotor 1 from being tilted.

Similarly, the first discharge port 29*a* and the second discharge port 29*b* are also open in the same shape at symmetrical positions with the inner rotor 2 and the outer rotor 1 therebetween. Accordingly, the pressure received by the inner rotor 2 and the outer rotor 1 from fluid in the first discharge port 29*a* and the pressure received by the inner rotor 2 and the outer rotor 1 from fluid in the second discharge port 29*b* are balanced to prevent the inner rotor 2 and the outer rotor 1 from being tilted.

Figure 2:
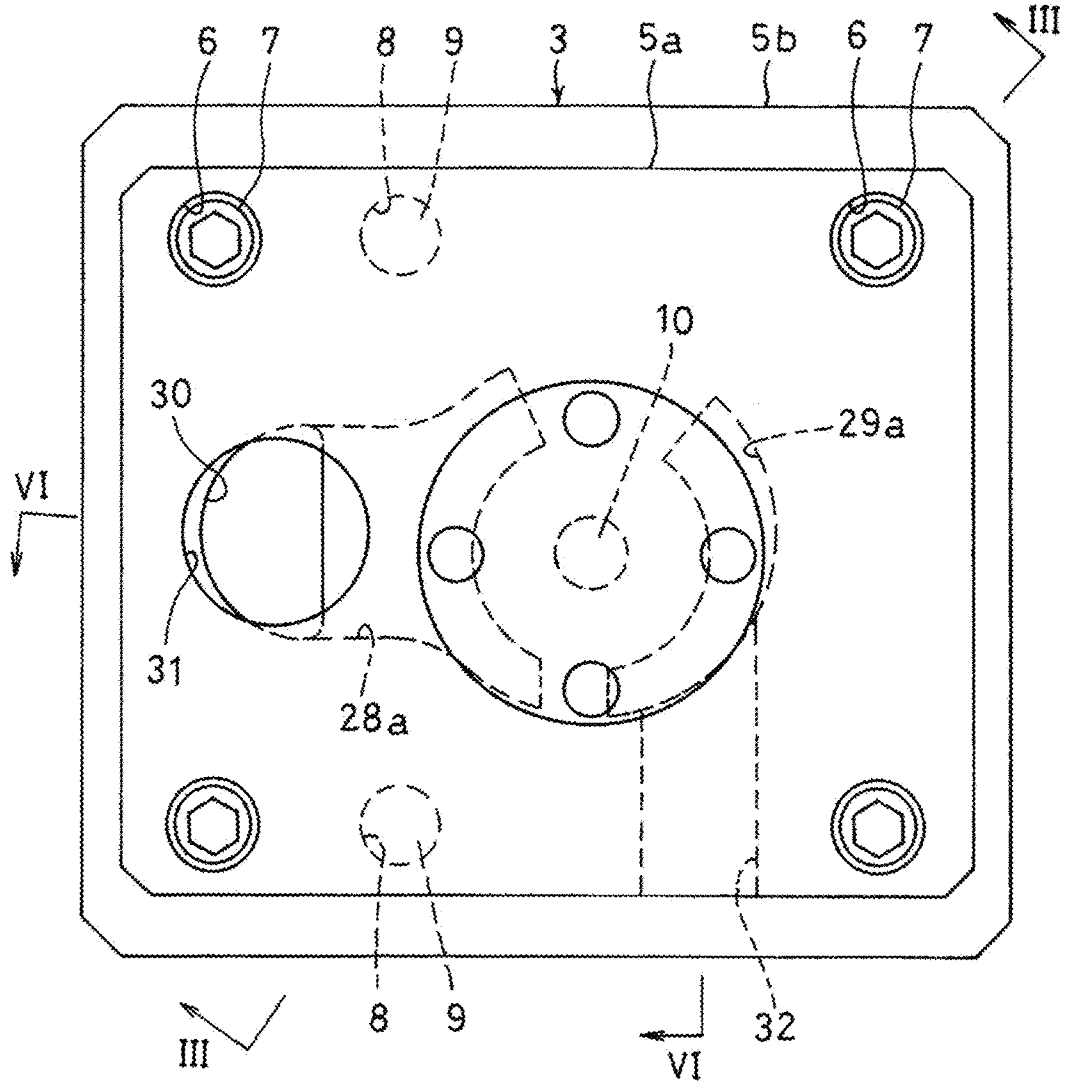
FIG. 2 is a front view of the internal gear pump in FIG. 1.

As shown in FIG. 4 and FIG. 6, the first suction port 28*a* and the second suction port 28*b* communicate with each other through a communication passage 30 which is formed in the housing body 4. In addition, as shown in FIG. 2 and FIG. 6, the first suction port 28*a* communicates with a suction port 31 which is open on the outer surface of the first side component 5*a*, and the first discharge port 29*a* communicates with a discharge port 32 which is open on the outer surface of the first side component 5*a*.

Figure 7:
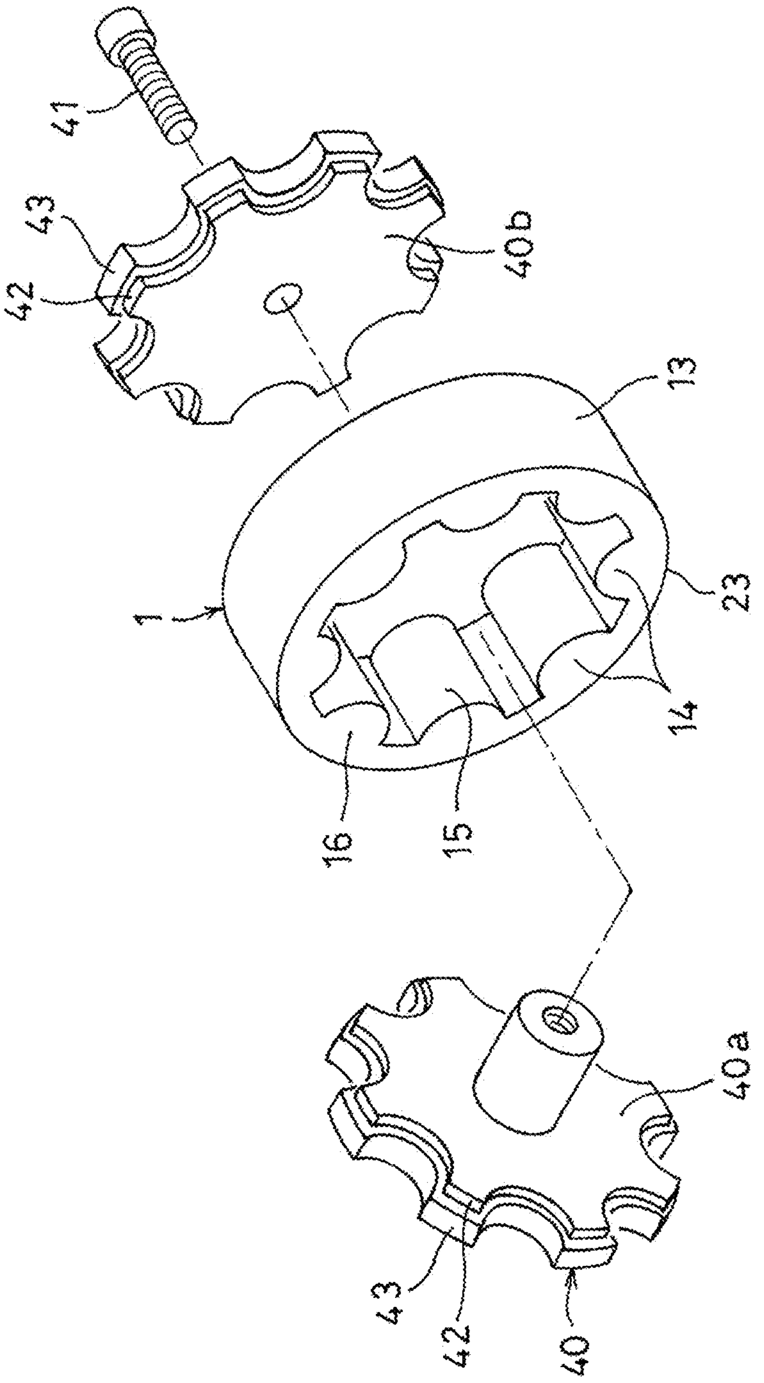
FIG. 7 is a diagram illustrating a method for manufacturing the outer rotor shown in FIG. 5, and is an exploded perspective view showing an outer masking jig and the outer rotor before coating with a fluororesin.
Figure 8:
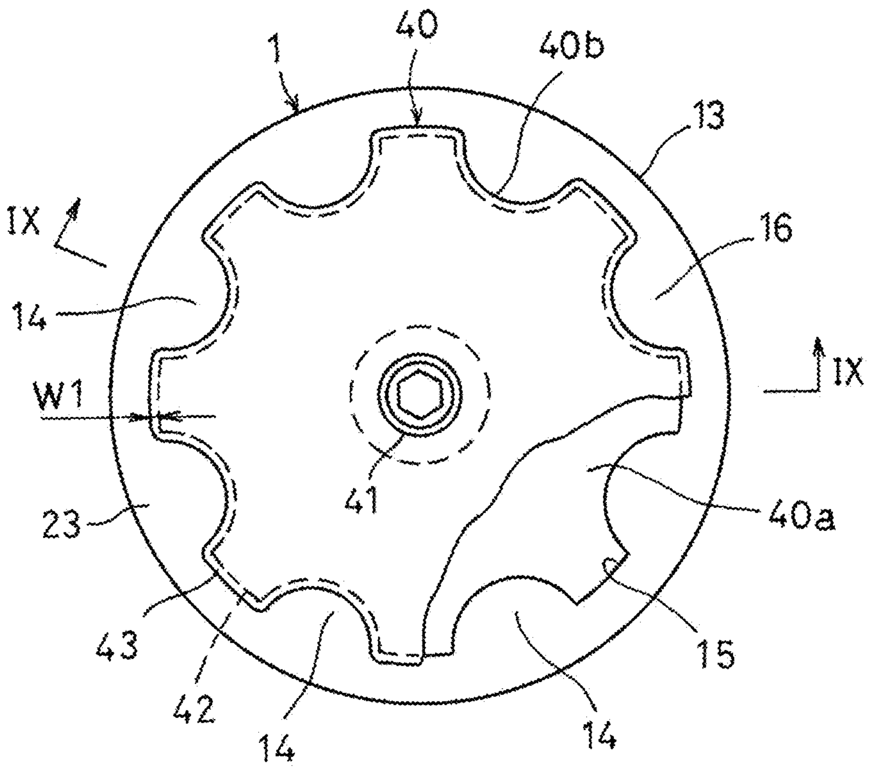
FIG. 8 is a partial cross-sectional view showing a state where the outer masking jig is mounted on the outer rotor shown in FIG. 7.
Figure 9:
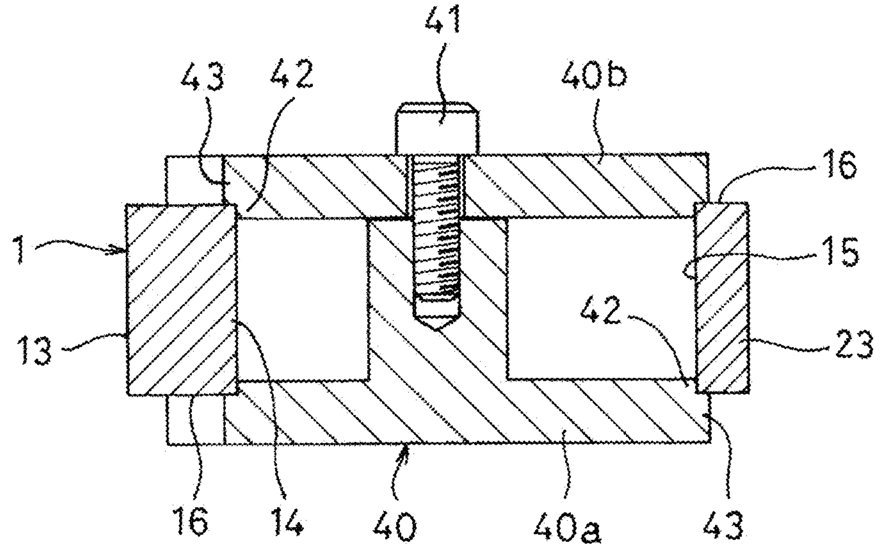
FIG. 9 is a cross-sectional view taken along a line IX-IX in FIG. 8.

A method for manufacturing the outer rotor 1 in which the side surfaces 16 and the outer peripheral surface 13 are coated with the crosslinked fluororesin 22 will be described with reference to FIG. 7 to FIG. 9.

First, the outer rotor 1 before coating and an outer masking jig 40 are prepared. The outer masking jig 40 is a jig for covering the inner peripheral surface 15 of the outer rotor 1 in a state where the side surfaces 16 of the outer rotor 1 are exposed. The outer masking jig 40 includes a first jig 40*a* for closing an opening on one side in the axial direction of the outer rotor 1, and a second jig 40*b* for closing an opening on the other side in the axial direction of the outer rotor 1. The first jig 40*a* and the second jig 40*b* are connected to each other by a bolt 41 inside the outer rotor 1. The first jig 40*a* and the second jig 40*b* each have a positioning fitting tooth portion 42 and a toothed flange 43.

The positioning fitting tooth portion 42 is a portion for positioning the outer rotor 1 in the circumferential direction by fitting to the inner peripheral surface 15 of the outer rotor 1. The outer peripheral surface of the positioning fitting tooth portion 42 is a curved surface obtained as a trajectory by translating, in the axial direction, a curve having a shape obtained by offsetting the tooth profile of the internal teeth 14 to the radially inner side. Here, the outer peripheral surface of the positioning fitting tooth portion 42 is formed such that the interval between the outer peripheral surface of the positioning fitting tooth portion 42 and the inner peripheral surface 15 of the outer rotor 1 is not greater than 0.2 mm (preferably not greater than 0.15 mm). The axial length of the positioning fitting tooth portion 42 is set so as to be not greater than 2.0 mm (preferably not greater than 1.5 mm).

The toothed flange 43 is a portion formed so as to project radially outward from the axially outer end of the positioning fitting tooth portion 42. The toothed flange 43 has a toothed shape corresponding to the internal teeth 14 such that the toothed flange 43 overlaps peripheral portions, along the inner peripheral surface 15, of the side surfaces 16 of the outer rotor 1. That is, the outer peripheral surface of the toothed flange 43 is a curved surface obtained as a trajectory by translating, in the axial direction, a curve having a shape obtained by offsetting the tooth profile of the internal teeth 14 to the radially outer side. The outer peripheral surface of the toothed flange 43 is formed such that the distance by which the outer peripheral surface of the toothed flange 43 protrudes from the inner peripheral surface 15 of the outer rotor 1 to the radially outer side (a width w1 of a band-shaped region where the toothed flange 43 overlaps the side surfaces 16 of the outer rotor 1 as shown in FIG. 8) is not greater than 0.5 mm (preferably not greater than 0.3 mm).

Then, the outer masking jig 40 is mounted to the outer rotor 1 before coating, and in this state, the outer rotor 1 is coated with an uncrosslinked fluororesin. Specifically, a dispersion liquid obtained by dispersing fine particles of the fluororesin (for example, PTFE) in water is applied to the surface of the outer rotor 1 to which the outer masking jig 40 has been mounted. The application can be performed by dipping (immersion) or spraying. Thereafter, a coating layer of the fine particles of the uncrosslinked fluororesin is formed on the surface of the outer rotor 1 by drying the applied dispersion liquid. At this time, both the side surfaces 16 and the outer peripheral surface 13 of the outer rotor 1 are coated with the fine particles of the uncrosslinked fluororesin. Thereafter, the outer masking jig 40 is removed from the outer rotor 1, and the outer rotor 1 is heated to a temperature equal to or higher than the melting point of the fluororesin, thereby baking the fine particles of the uncrosslinked fluororesin with which the side surfaces 16 and the outer peripheral surface 13 of the outer rotor 1 have been coated, to fuse the fine particles of the fluororesin. The outer masking jig 40 may be removed after baking the fluororesin.

Thereafter, the fluororesin on the side surfaces 16 and the outer peripheral surface 13 of the outer rotor 1 is crosslinked by irradiating the outer rotor 1 with radiation in a state where the outer masking jig 40 is removed from the outer rotor 1. Specifically, in a state where the outer masking jig 40 is removed from the outer rotor 1, the outer rotor 1 is placed in an oxygen-free atmosphere having a predetermined high temperature, and radiation (for example, electron beam) is applied toward the surface of the outer rotor 1, thereby forming covalent bonds between molecules of a chain polymer forming the fluororesin, to crosslink the molecules of the chain polymer. In addition, chemical bonds are also formed between the outer rotor 1 and the molecules of the chain polymer forming the fluororesin, by the radiation applied at this time, and the adhesion of the crosslinked fluororesin 22 becomes very high through the chemical bonds. Thereafter, if necessary, the surface of the crosslinked fluororesin 22 is finished by grinding or polishing.

Figure 10:
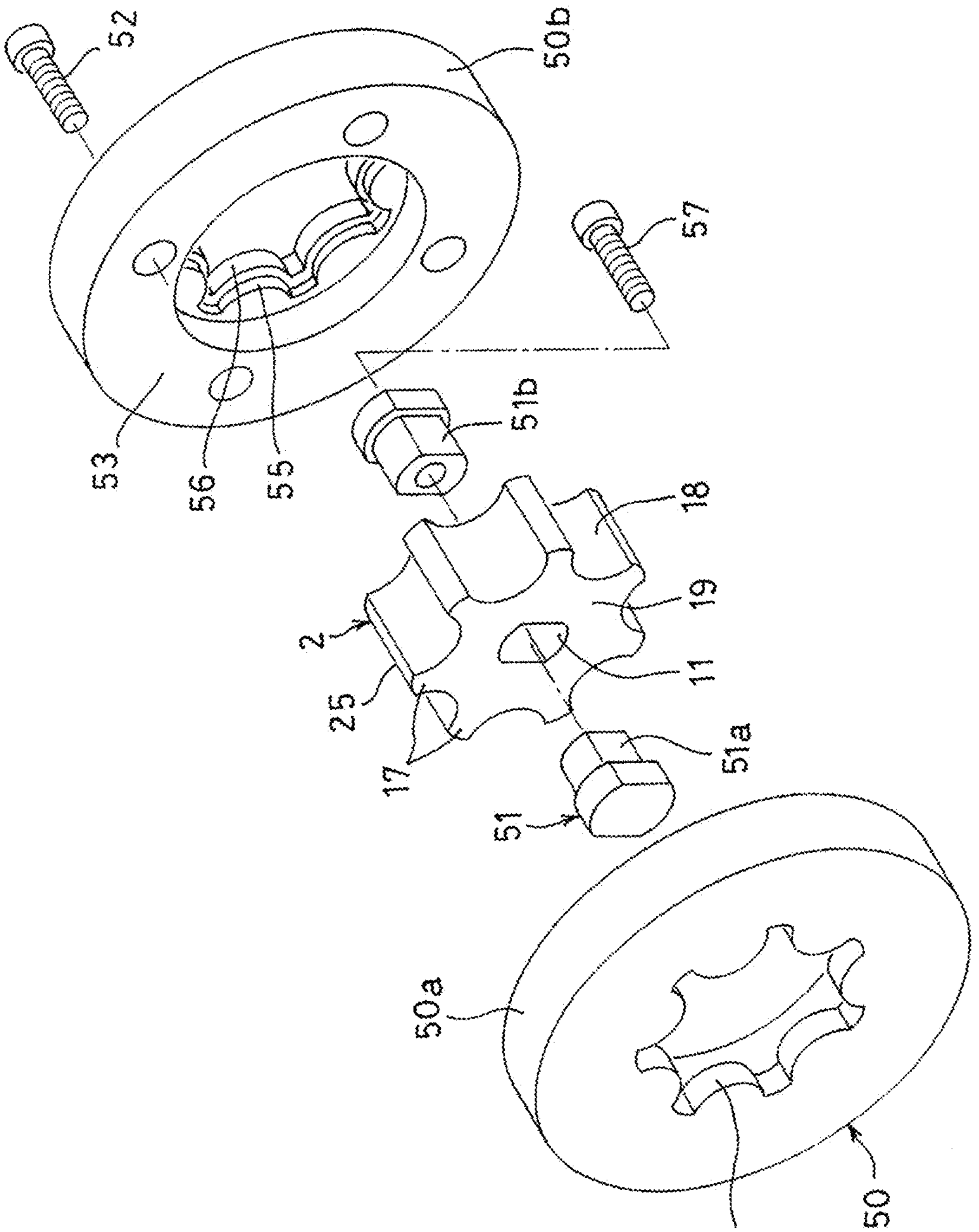
FIG. 10 is a diagram illustrating a method for manufacturing the inner rotor shown in FIG. 5, and an exploded perspective view showing an inner masking jig, a shaft hole masking jig, and the inner rotor before coating with a fluororesin.
Figure 11:
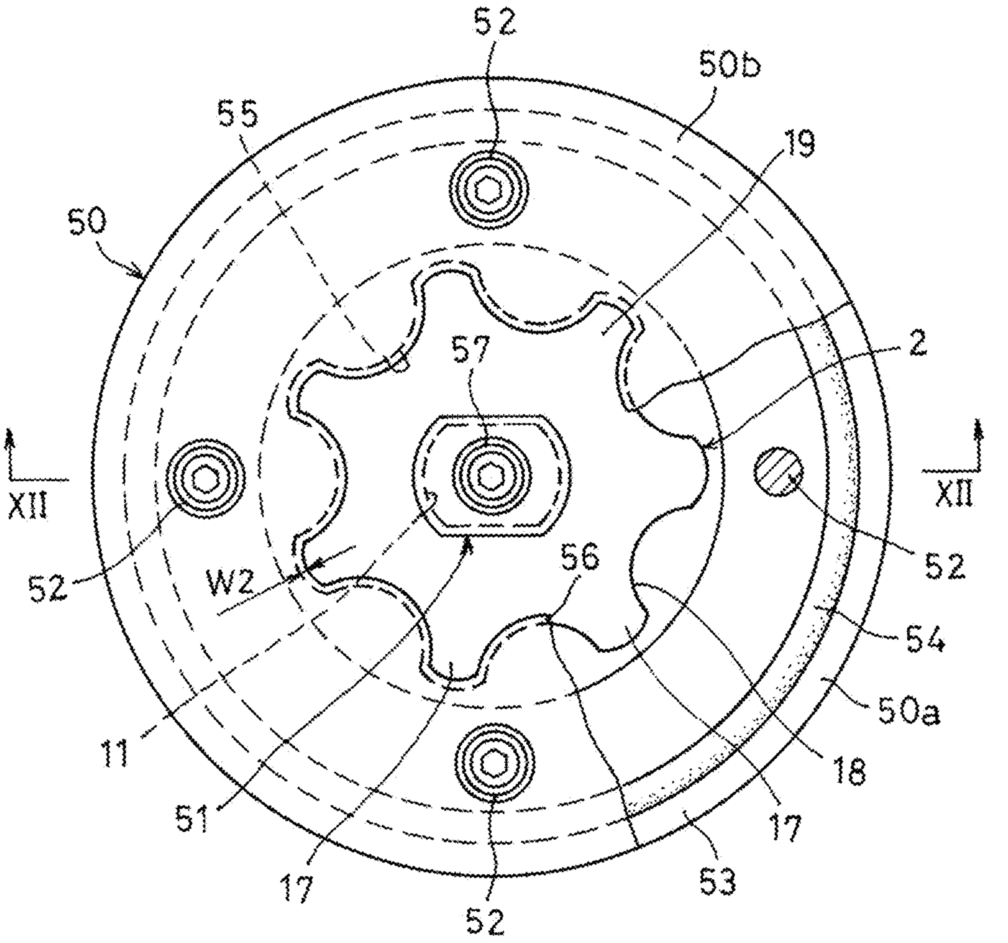
FIG. 11 is a partial cross-sectional view showing a state where the inner masking jig and the shaft hole masking jig are mounted on the inner rotor shown in FIG. 10.
Figure 12:
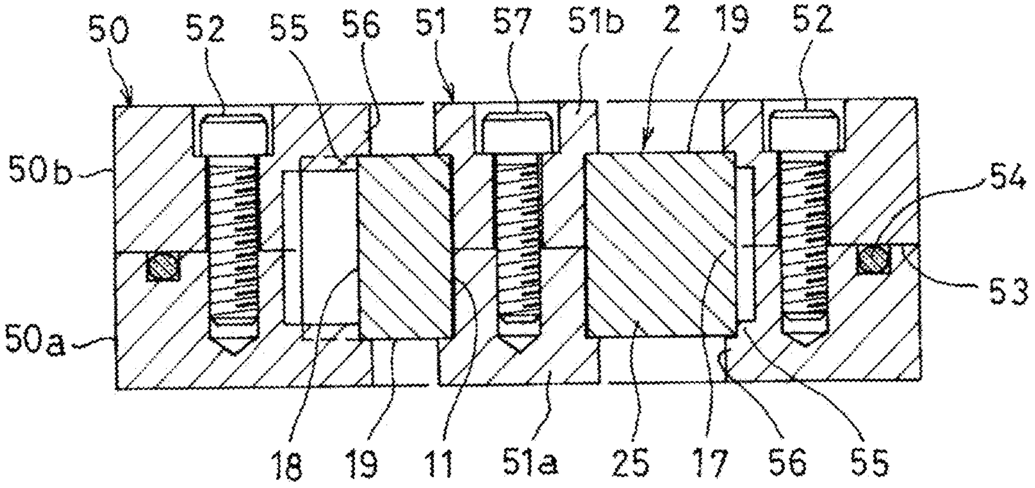
FIG. 12 is a cross-sectional view taken along a line XII-XII in FIG. 11.

A method for manufacturing the inner rotor 2 in which the side surfaces 19 are coated with the crosslinked fluororesin 24 will be described with reference to FIG. 10 to FIG. 12.

The inner rotor 2 before coating, an inner masking jig 50, and a shaft hole masking jig 51 are prepared. The inner masking jig 50 is a jig for covering the outer peripheral surface 18 of the inner rotor 2 in a state where the side surfaces 19 of the inner rotor 2 are exposed. The inner masking jig 50 includes a first jig 50*a* to be fitted to the outer periphery of an end portion on one side in the axial direction of the inner rotor 2, and a second jig 50*b* to be fitted to the outer periphery of an end portion on the other side in the axial direction of the inner rotor 2. The first jig 50*a* and the second jig 50*b* are connected to each other by bolts 52 on the radially outer side of the inner rotor 2. The first jig 50*a* and the second jig 50*b* have mating surfaces 53 in the axial direction. An annular sealing member 54 (see FIG. 11 and FIG. 12) for sealing the mating surfaces 53 is incorporated between the first jig 50*a* and the second jig 50*b*. The first jig 50*a* and the second jig 50*b* each have a positioning fitting tooth portion 55 and a toothed flange 56.

The positioning fitting tooth portion 55 is a portion for positioning the inner rotor 2 in the circumferential direction by fitting to the outer peripheral surface 18 of the inner rotor 2. The inner peripheral surface of the positioning fitting tooth portion 55 is a curved surface obtained as a trajectory by translating, in the axial direction, a curve having a shape obtained by offsetting the tooth profile of the external teeth 17 to the radially outer side. Here, the inner peripheral surface of the positioning fitting tooth portion 55 is formed such that the interval between the inner peripheral surface of the positioning fitting tooth portion 55 and the outer peripheral surface 18 of the inner rotor 2 is not greater than 0.2 mm (preferably not greater than 0.15 mm). The axial length of the positioning fitting tooth portion 55 is set so as to be not greater than 2.0 mm (preferably not greater than 1.5 mm).

The toothed flange 56 is a portion formed so as to project radially inward from the axially outer end of the positioning fitting tooth portion 55. The toothed flange 56 has a toothed shape corresponding to the external teeth 17 such that the toothed flange 56 overlaps peripheral portions, along the outer peripheral surface 18, of the side surfaces 19 of the inner rotor 2. That is, the inner peripheral surface of the toothed flange 56 is a curved surface obtained as a trajectory by translating, in the axial direction, a curve having a shape obtained by offsetting the tooth profile of the external teeth 17 to the radially inner side. The inner peripheral surface of the toothed flange 56 is formed such that the distance from the outer peripheral surface 18 of the inner rotor 2 to the inner peripheral surface, of the toothed flange 56, located on the radially inner side thereof (a width w2 of a band-shaped region where the toothed flange 56 overlaps the side surfaces 19 of the inner rotor 2 as shown in FIG. 11) is not greater than 0.5 mm (preferably not greater than 0.3 mm).

The shaft hole masking jig 51 includes a first jig 51*a* for closing an opening on one side in the axial direction of the shaft hole 11, and a second jig 51*b* for closing an opening on the other side in the axial direction of the shaft hole 11. The first jig 51*a* and the second jig 51*b* are connected to each other by a bolt 57 inside the shaft hole 11.

Then, the inner masking jig 50 and the shaft hole masking jig 51 are mounted to the inner rotor 2 before coating, and in this state, the inner rotor 2 is coated with an uncrosslinked fluororesin. Specifically, a dispersion liquid obtained by dispersing fine particles of the fluororesin (for example, PTFE) in water is applied to the surface of the inner rotor 2 to which the inner masking jig 50 and the shaft hole masking jig 51 have been mounted. The application can be performed by dipping (immersion) or spraying. Thereafter, a coating layer of the fine particles of the uncrosslinked fluororesin is formed on the surface of the inner rotor 2 by drying the applied dispersion liquid. At this time, the side surfaces 19 of the inner rotor 2 are coated with the fine particles of the uncrosslinked fluororesin. Thereafter, the inner masking jig 50 and the shaft hole masking jig 51 are removed from the inner rotor 2, and the inner rotor 2 is heated to a temperature equal to or higher than the melting point of the fluororesin, thereby baking the fine particles of the uncrosslinked fluororesin with which the side surfaces 19 of the inner rotor 2 have been coated, to fuse the fine particles of the fluororesin. The inner masking jig 50 and the shaft hole masking jig 51 may be removed after baking the fluororesin.

Thereafter, the fluororesin on the side surfaces 19 of the inner rotor 2 is crosslinked by irradiating the inner rotor 2 with radiation in a state where the inner masking jig 50 and the shaft hole masking jig 51 are removed from the inner rotor 2. Specifically, in a state where the inner masking jig 50 and the shaft hole masking jig 51 are removed from the inner rotor 2, the inner rotor 2 is placed in an oxygen-free atmosphere having a predetermined high temperature, and radiation (for example, electron beam) is applied toward the surface of the inner rotor 2, thereby forming covalent bonds between molecules of a chain polymer forming the fluororesin, to crosslink the molecules of the chain polymer. In addition, chemical bonds are also formed between the inner rotor 2 and the molecules of the chain polymer forming the fluororesin, by the radiation applied at this time, and the adhesion of the crosslinked fluororesin 24 becomes very high through the chemical bonds. Thereafter, if necessary, the surface of the crosslinked fluororesin 24 is finished by grinding or polishing.

When the outer rotor 1 and the inner rotor 2 coated with the crosslinked fluororesins 22 and 24 are manufactured as in the above embodiment, seizure of the outer rotor 1 and the inner rotor 2 can be prevented over a long period of time, and it is possible to easily manufacture the outer rotor 1 and the inner rotor 2 having stable performance.

That is, when the outer rotor 1 in which the side surfaces 16 and the outer peripheral surface 13 are coated with the crosslinked fluororesin 22 is manufactured as in the above embodiment, since the side surfaces 16 of the outer rotor 1 are coated with the crosslinked fluororesin 22, even when the side clearance of the outer rotor 1 is set to be very small, it is possible to prevent seizure of the outer rotor 1 over a long period of time.

Since the outer masking jig 40 for covering the inner peripheral surface 15 in a state where the side surfaces 16 of the outer rotor 1 are exposed is used when coating the outer rotor 1 with the uncrosslinked fluororesin, the inner peripheral surface 15 of the outer rotor 1 is not coated with the fluororesin. Therefore, the size of the tip clearance between the internal teeth 14 on the inner periphery of the outer rotor 1 and the external teeth 17 on the outer periphery of the inner rotor 2 becomes stable, and the pump performance becomes stable.

Since the positioning fitting tooth portion 42 for positioning the outer masking jig 40 with respect to the outer rotor 1 in the circumferential direction by fitting to the inner peripheral surface 15 of the outer rotor 1 is formed in the outer masking jig 40, the work of mounting the outer masking jig 40 to the outer rotor 1 is easy.

When crosslinking the uncrosslinked fluororesin by irradiating the fluororesin with radiation, the irradiation with radiation is performed in a state where the outer masking jig 40 is removed from the outer rotor 1. Therefore, the radiation is prevented from being blocked by the outer masking jig 40, and it is possible to evenly and uniformly crosslink the fluororesin.

Since the outer masking jig 40 has the toothed flange 43 when coating the outer rotor 1 with the uncrosslinked fluororesin, most of each side surface 16 of the outer rotor 1 can be exposed while assuredly covering the inner peripheral surface 15 of the outer rotor 1. Therefore, it is possible to coat most of each side surface 16 of the outer rotor 1 with the crosslinked fluororesin 22 while preventing the inner peripheral surface 15 of the outer rotor 1 from being coated.

Since the toothed flange 43 is formed such that the region where the toothed flange 43 overlaps the side surfaces 16 of the outer rotor 1 has a width w1 (see FIG. 8) of not greater than 0.5 mm (preferably not greater than 0.3 mm), it is possible to coat almost the entirety of each side surface 16 of the outer rotor 1 with the crosslinked fluororesin 22.

Since not only the side surfaces 16 of the outer rotor 1 but also the outer peripheral surface 13 of the outer rotor 1 is coated with the crosslinked fluororesin 22, it is possible to effectively reduce the torque for rotationally driving the outer rotor 1.

When the inner rotor 2 in which the side surfaces 19 are coated with the crosslinked fluororesin 24 is manufactured as in the above embodiment, since the side surfaces 19 of the inner rotor 2 are coated with the crosslinked fluororesin 24, even when the side clearance of the inner rotor 2 is set to be very small, it is possible to prevent seizure of the inner rotor 2 over a long period of time.

Since the inner masking jig 50 for covering the outer peripheral surface 18 in a state where the side surfaces 19 of the inner rotor 2 are exposed is used when coating the inner rotor 2 with the uncrosslinked fluororesin, the outer peripheral surface 18 of the inner rotor 2 is not coated with the fluororesin. Therefore, the size of the tip clearance between the internal teeth 14 on the inner periphery of the outer rotor 1 and the external teeth 17 on the outer periphery of the inner rotor 2 becomes stable, and the pump performance becomes stable.

Since the positioning fitting tooth portion 55 for positioning the inner masking jig 50 with respect to the inner rotor 2 in the circumferential direction by fitting to the outer peripheral surface 18 of the inner rotor 2 is formed in the inner masking jig 50, the work of mounting the inner masking jig 50 to the inner rotor 2 is easy.

When crosslinking the uncrosslinked fluororesin by irradiating the fluororesin with radiation, the irradiation with radiation is performed in a state where the inner masking jig 50 is removed from the inner rotor 2. Therefore, the radiation is prevented from being blocked by the inner masking jig 50, and it is possible to evenly and uniformly crosslink the fluororesin.

Since the inner masking jig 50 has the toothed flange 56, when coating the inner rotor 2 with the uncrosslinked fluororesin, most of each side surface 19 of the inner rotor 2 can be exposed while assuredly covering the outer peripheral surface 18 of the inner rotor 2 with the toothed flange 56. Therefore, it is possible to coat most of each side surface 19 of the inner rotor 2 with the crosslinked fluororesin 24 while preventing the outer peripheral surface 18 of the inner rotor 2 from being coated.

Since the toothed flange 56 is formed such that the region where the toothed flange 56 overlaps the side surfaces 19 of the inner rotor 2 has a width w2 (see FIG. 11) of not greater than 0.5 mm (preferably not greater than 0.3 mm), it is possible to coat almost the entirety of each side surface 19 of the inner rotor 2 with the crosslinked fluororesin 24.

REFERENCE SIGNS LIST

1 outer rotor
2 inner rotor
3 housing
4 housing body
5*a* first side component
5*b* second side component
6 bolt insertion hole
7 bolt
8 knock pin insertion hole
9 knock pin
10 rotation shaft
11 shaft hole
12*a* first bearing
12*b* second bearing
13 outer peripheral surface
14 internal teeth
15 inner peripheral surface
16 side surface
17 external teeth
18 outer peripheral surface
19 side surface
20 inner peripheral surface
21 chamber
22 crosslinked fluororesin
23 sintered metal body
24 crosslinked fluororesin
25 sintered metal body
26 mating surface
27 sliding guide surface
28*a* first suction port
28*b* second suction port
29*a* first discharge port
29*b* second discharge port
30 communication passage
31 suction port
32 discharge port
40 outer masking jig
40*a* first jig
40*b* second jig
41 bolt
42 positioning fitting tooth portion
43 toothed flange
50 inner masking jig
50*a* first jig
50*b* second jig
51 shaft hole masking jig
51*a* first jig
51*b* second jig
52 bolt
53 mating surface
54 sealing member
55 positioning fitting tooth portion
56 toothed flange
57 bolt
w1 width of region where toothed flange overlaps side surfaces of outer rotor
w2 width of region where toothed flange overlaps side surfaces of inner rotor

The invention claimed is:

1. A crosslinked fluororesin-coated rotor manufacturing method for manufacturing an annular outer rotor of an internal gear pump including the outer rotor having an inner peripheral surface forming a plurality of internal teeth, and side surfaces orthogonal to an axial direction, and an inner rotor having an outer peripheral surface forming a plurality of external teeth which mesh with the internal teeth, and configured to rotate about a position eccentric from a center of the outer rotor on a radially inner side of the outer rotor, wherein the side surfaces of the outer rotor are coated with a crosslinked fluororesin, and the inner peripheral surface of the outer rotor is not coated with the crosslinked fluororesin, the method comprising the steps of:

using an outer masking jig for covering the inner peripheral surface in a state where the side surfaces of the outer rotor are exposed, the outer masking jig including a positioning fitting tooth portion for positioning the outer masking jig with respect to the outer rotor in a circumferential direction by fitting to the inner peripheral surface of the outer rotor;

coating the outer rotor with an uncrosslinked fluororesin in a state where the outer masking jig is mounted to the outer rotor; and then irradiating the fluororesin with radiation in a state where the outer masking jig is removed from the outer rotor, to crosslink the fluororesin.

2. The crosslinked fluororesin-coated rotor manufacturing method according to claim 1, wherein the outer masking jig has a toothed flange which overlaps peripheral portions, along the inner peripheral surface, of the side surfaces of the outer rotor.

3. The crosslinked fluororesin-coated rotor manufacturing method according to claim 2, wherein the outer rotor has a cylindrical outer peripheral surface, and the method further includes the steps of:

coating both the side surfaces and the outer peripheral surface of the outer rotor with the uncrosslinked fluororesin when coating the outer rotor with the uncrosslinked fluororesin in a state where the outer masking jig is mounted to the outer rotor; and then crosslinking both the fluororesin on the side surfaces and the fluororesin on the outer peripheral surface when irradiating the fluororesin with radiation in a state where the outer masking jig is removed from the outer rotor.

4. The crosslinked fluororesin-coated rotor manufacturing method according to claim 2, wherein the toothed flange is formed such that a region where the toothed flange overlaps the side surfaces of the outer rotor has a width of not greater than 0.5 mm.

5. The crosslinked fluororesin-coated rotor manufacturing method according to claim 3, wherein the outer rotor has a cylindrical outer peripheral surface, and the method further includes the steps of:

coating both the side surfaces and the outer peripheral surface of the outer rotor with the uncrosslinked fluororesin when coating the outer rotor with the uncrosslinked fluororesin in a state where the outer masking jig is mounted to the outer rotor; and then crosslinking both the fluororesin on the side surfaces and the fluororesin on the outer peripheral surface when irradiating the fluororesin with radiation in a state where the outer masking jig is removed from the outer rotor.

6. The crosslinked fluororesin-coated rotor manufacturing method according to claim 1, wherein the outer rotor has a cylindrical outer peripheral surface, and the method further includes the steps of:

coating both the side surfaces and the outer peripheral surface of the outer rotor with the uncrosslinked fluororesin when coating the outer rotor with the uncrosslinked fluororesin in a state where the outer masking jig is mounted to the outer rotor; and then crosslinking both the fluororesin on the side surfaces and the fluororesin on the outer peripheral surface when irradiating the fluororesin with radiation in a state where the outer masking jig is removed from the outer rotor.

7. A crosslinked fluororesin-coated rotor manufacturing method for manufacturing an inner rotor of an internal gear pump including an annular outer rotor having an inner peripheral surface forming a plurality of internal teeth, and the inner rotor having an outer peripheral surface forming a plurality of external teeth which mesh with the internal teeth, and side surfaces orthogonal to an axial direction, and configured to rotate about a position eccentric from a center of the outer rotor on a radially inner side of the outer rotor, the side surfaces of the inner rotor being coated with a crosslinked fluororesin, the outer peripheral surface of the inner rotor not being coated with the crosslinked fluororesin, the method further comprising the steps of:

using an inner masking jig for covering the outer peripheral surface in a state where the side surfaces of the inner rotor are exposed, the inner masking jig including a positioning fitting tooth portion for positioning the inner masking jig with respect to the inner rotor in a circumferential direction by fitting to the outer peripheral surface of the inner rotor;

coating the inner rotor with an uncrosslinked fluororesin in a state where the inner masking jig is mounted to the inner rotor; and then irradiating the fluororesin with radiation in a state where the inner masking jig is removed from the inner rotor, to crosslink the fluororesin.

8. The crosslinked fluororesin-coated rotor manufacturing method according to claim 7, wherein the inner masking jig has a toothed flange which overlaps peripheral portions, along the outer peripheral surface, of the side surfaces of the inner rotor.

9. The crosslinked fluororesin-coated rotor manufacturing method according to claim 8, wherein the toothed flange is formed such that a region where the toothed flange overlaps the side surfaces of the inner rotor has a width of not greater than 0.5 mm.

* * * * *